Figure 1:
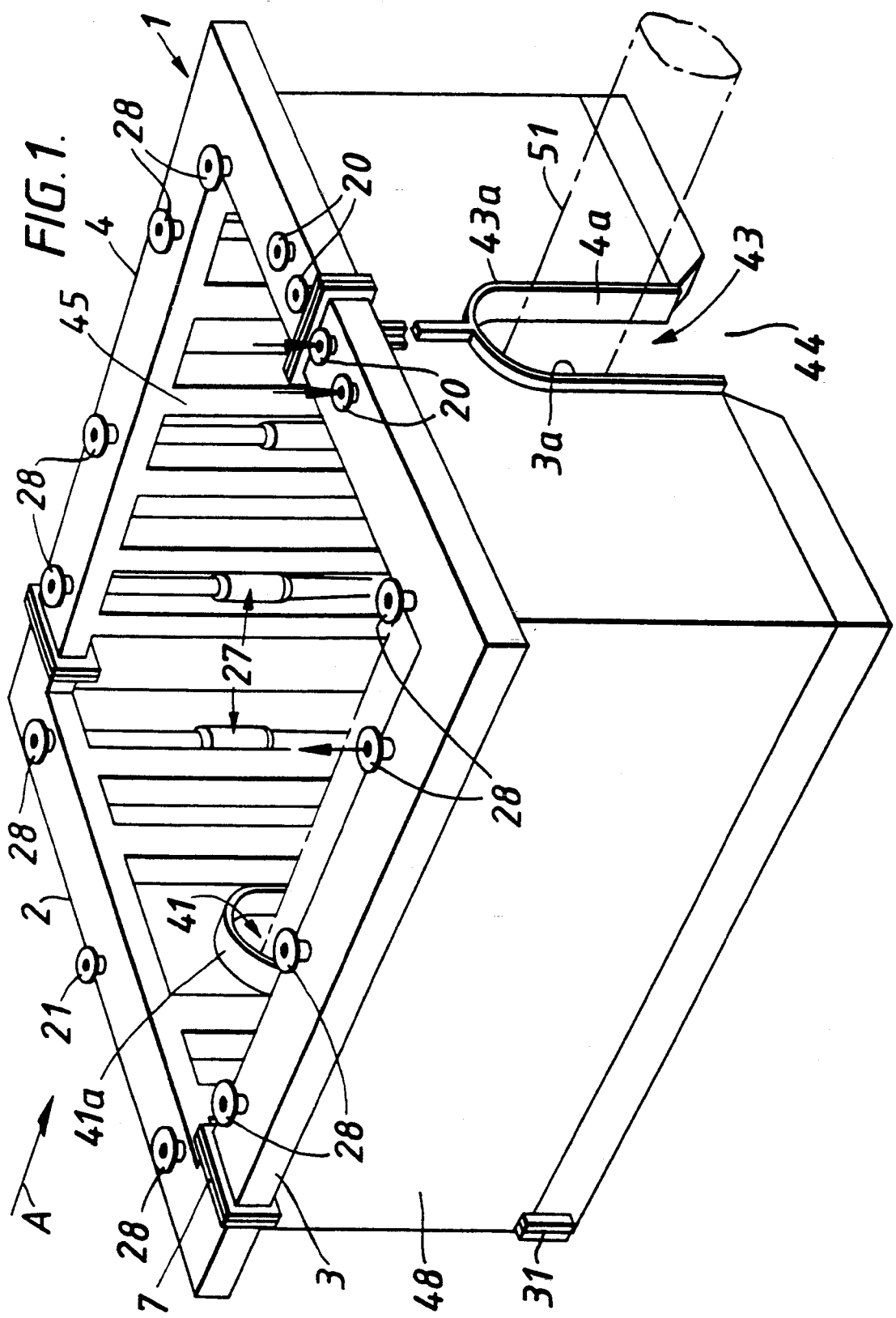

United States Patent [19]

Jones et al.

[11] Patent Number: 5,382,115

[45] Date of Patent: Jan. 17, 1995

[54] APPARATUS INTENDED TO BE BURIED IN GROUND BENEATH WATER

[75] Inventors: Brian A. Jones, Newbury; Derek W. Clarke, Torphins, both of United Kingdom

[73] Assignee: British Gas plc, England

[21] Appl. No.: 26,056

[22] Filed: Mar. 3, 1993

[30] Foreign Application Priority Data

Mar. 3, 1992 [GB] United Kingdom ............... 9204556

[51] Int. Cl.$^6$ .............................................. E02D 29/00
[52] U.S. Cl. ..................................... 405/226; 405/11; 405/185
[58] Field of Search .................. 405/11, 13, 14, 73, 405/74, 185, 226

[56] References Cited

U.S. PATENT DOCUMENTS

| | | |
|---|---|---|
| 1,520,945 | 12/1924 | Griesemer . |
| 1,529,084 | 3/1925 | Peters . |
| 1,690,239 | 11/1928 | Nicol . |
| 1,905,643 | 4/1933 | Johnson . |
| 2,931,187 | 4/1960 | Perkins . |
| 4,189,253 | 2/1980 | Pekor . |
| 4,408,405 | 10/1983 | Williams et al. . |

FOREIGN PATENT DOCUMENTS

| | | |
|---|---|---|
| 0268500 | 5/1988 | European Pat. Off. . |
| 772776 | 4/1957 | United Kingdom . |
| 2026574 | 2/1980 | United Kingdom . |

OTHER PUBLICATIONS

Patent Abstracts of Japan; vol. 8, No. 50 (M-281)(1487) 7 Mar. 1984 & JP-A-58 204 223 (Kajima Kensetsu K.K.) *abstract*.

Primary Examiner—David H. Corbin
Attorney, Agent, or Firm—Larson and Taylor

[57] ABSTRACT

Apparatus such as a cofferdam 1, intended to be partially buried in ground beneath water comprises a hollow structural framework. The framework includes chambers 12 which have inlets 29 via which pressurized water can be supplied to the chambers. Each chamber 12 communicates with a plurality of nozzles 36 from which jets of the pressurized fluid issue to break up the ground below. Each chamber 12 also communicates with a plurality of water operated pumps 25 via inlets 24. The pumps 25 are operated by the pressurized water to draw or suck water-suspended solids from below through the pumps via the inlets 32 and discharged from the pumps via outlets 28.

27 Claims, 6 Drawing Sheets

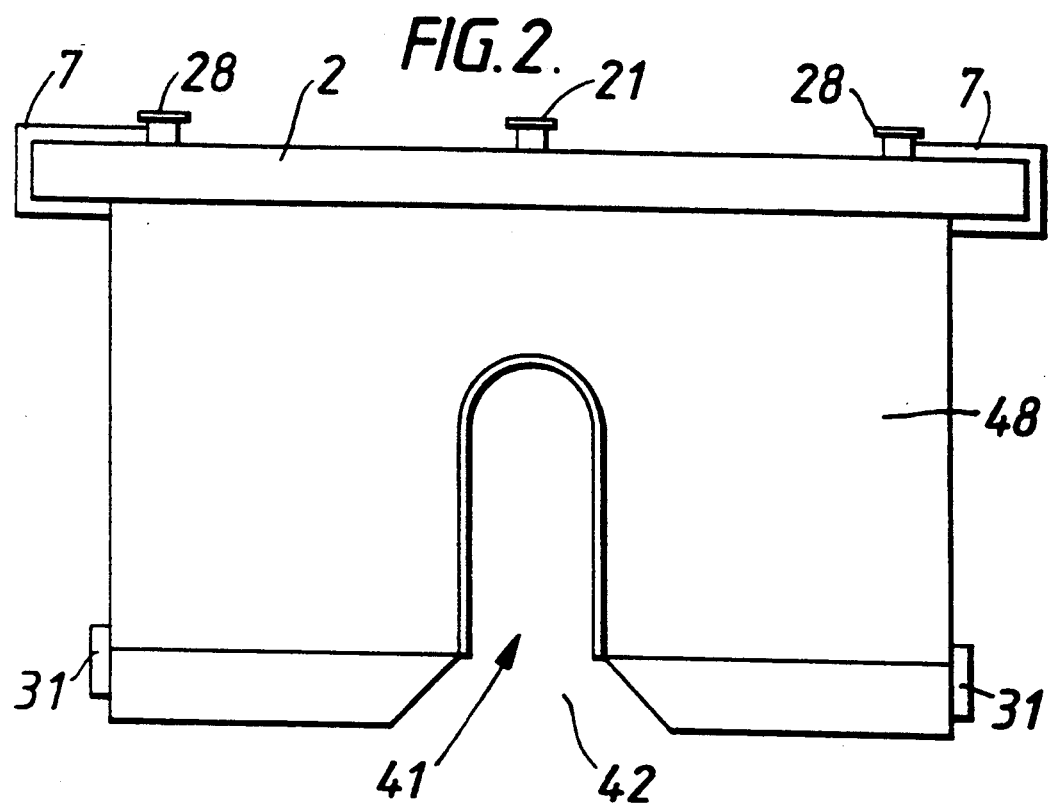
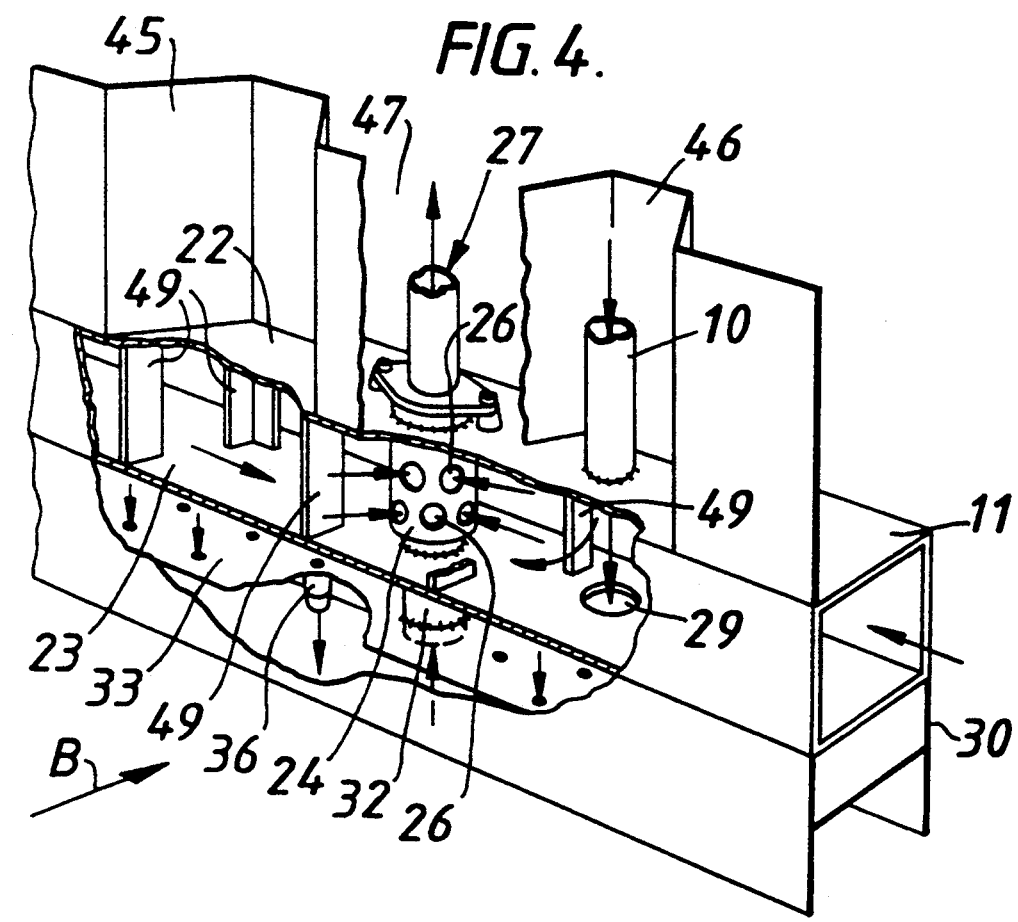

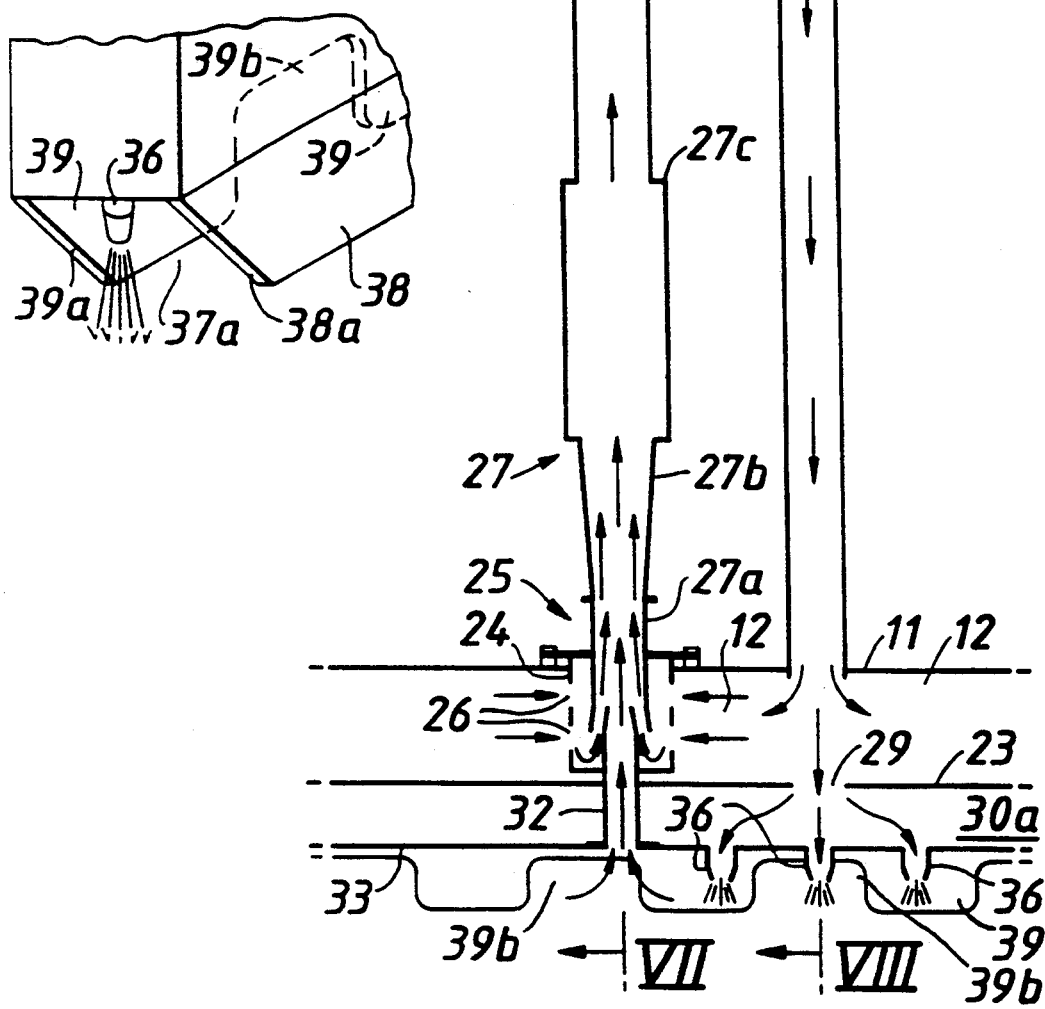

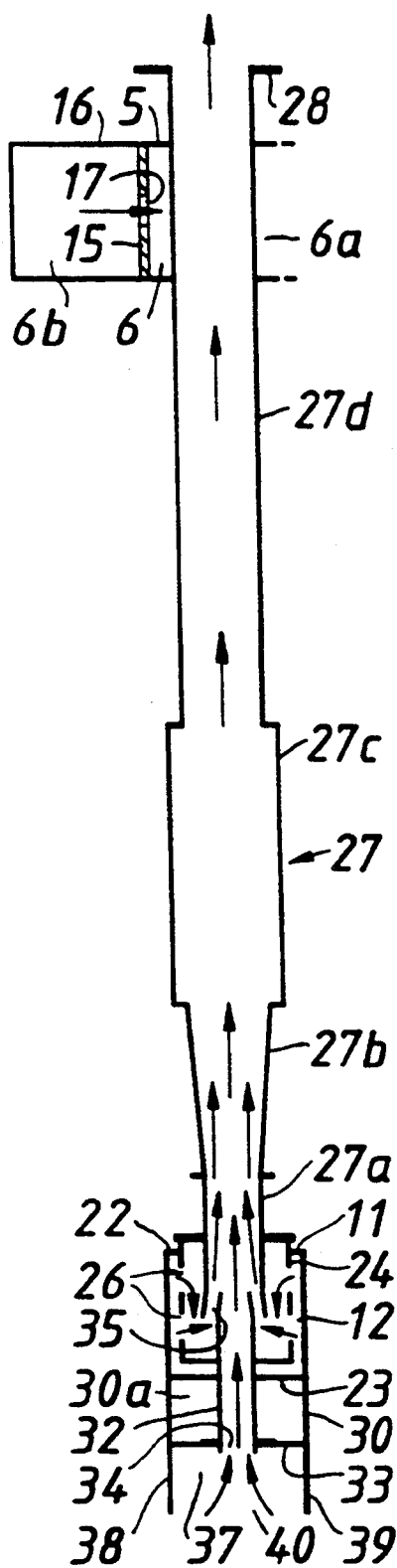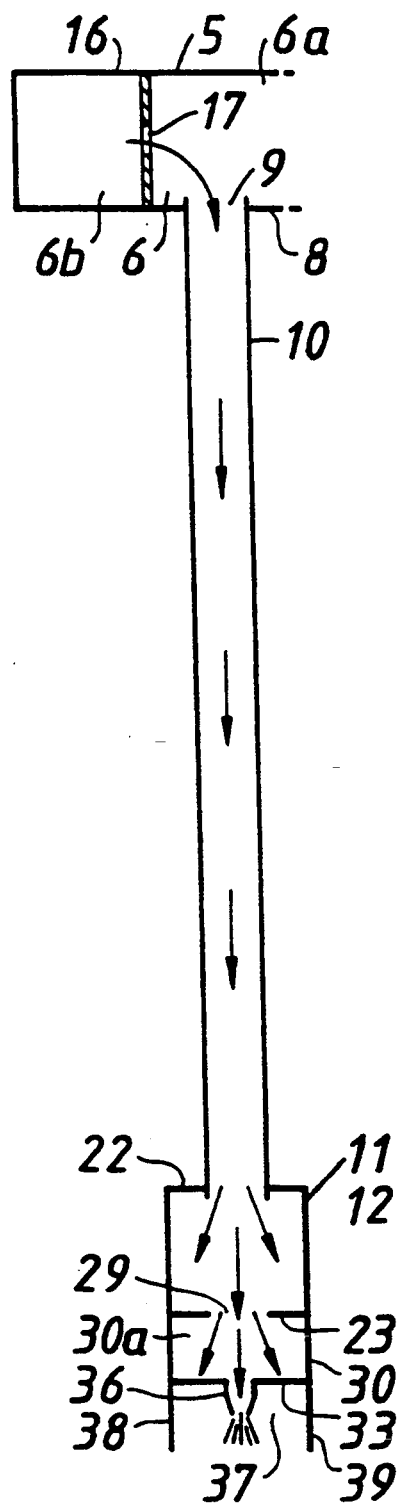

APPARATUS INTENDED TO BE BURIED IN GROUND BENEATH WATER

The present invention relates to apparatus intended to be at least partially buried in ground beneath water.

It is known that a sea bed, for example, may be formed of material, such as sandy soil, that can be fluidised by high powered water jets, thus producing suspended solids that can be sucked away by suction means. A body can then be at least partially sunk or buried in the sea bed. Such bodies may, for example, be caissons or piles.

Applicants activities include transporting natural gas from fields beneath the sea bed to the shore through sub sea pipelines. Sections of such pipelines often extend for considerable distances beneath the surface of the sea bed. From time to time maintenance or repair work may have to be carried out on a sub sea pipeline by divers. The divers are assisted if they are provided with a safe environment in the vicinity of the sea bed region in which they have to carry out their work. For example, an open-topped annular enclosure or cofferdam may be provided at the sea bed. The cofferdam is commonly of rectangular form having four sides or barrier walls to provide protection for the divers.

An object of the invention is to provide apparatus which includes means for use in enabling the apparatus itself to be buried in ground beneath water.

From one aspect of the invention, apparatus intended to be at least partially buried in ground beneath water, comprises a hollow structural framework including a chamber having an inlet via which pressurised fluid can be supplied to the chamber, the chamber communicating with a plurality of openings in the framework from which jets of the pressurised fluid are intended to issue and communicating with at least one fluid-operated pump via first pump inlet means, the pump being operable by the pressurised fluid to draw or suck water-suspended solids through the pump via second pump inlet means to discharge outlet means from the pump.

This apparatus utilises at least part of its hollow supporting structure as the means by which water can be supplied to and withdrawn from the apparatus as the apparatus is buried. Also the chamber serves to provide the water to the openings and also the water to the at least one pump. Thus, the openings and pump are not supplied with water via independently operable circuits. This arrangement facilitates the construction of apparatus of simple construction since no valves or plugs are required in the hollow framework to isolate the supply of water to the openings from the supply to the first pump inlet means. Instead, the chamber may be viewed as an inlet manifold for serving both the openings and the pump always at the same time.

The chamber may serve as a first chamber having outlets connected by pipes to a second chamber below the first chamber with the second chamber containing the first pump inlet means and communicating with the openings. The pipes may also be part of the structural framework. In one form of apparatus the first and second chambers may be generally horizontally extending and the pipes may be generally vertically extending.

The second chamber may have at least one aperture which opens into a third chamber, and the openings may be provided in a wall of the third chamber. The third chamber may be beneath the second chamber.

Conveniently, the second pump inlet means extends through a wall of the third chamber to open outwardly thereof. The apparatus may be provided with a plurality of pumps spaced along the second chamber with the jet openings provided in, and the second pump inlet means extending through, a common wall of the second chamber.

The discharge outlet means of the or each pump may comprise a tubular member which extends upwardly and through the first chamber. In one embodiment of the apparatus the or each tubular member and the or each pipe, as described above, may extend substantially vertically between horizontally extending first and second chambers.

The second pump inlet means and the openings may open into a channel. The walls of the channel are for both limiting the flow of material beyond the walls into the channel and limiting the dispersal or movement of the water suspended-solids produced by the jets of fluid away from the vicinity of the second pump inlet means over which the pump is effective in removing such suspended-solids. Thus, the provision of the channel may enhance or maximise the removal of the suspended solids.

In one convenient form of apparatus, the mouth of the channel is directed downward and the openings and the second pump inlet means open between the opposite side walls of the channel. The channel may extend along the bottom of the framework. When the apparatus is used it may be so manipulated that the free longitudinal edges of the opposite side walls of the channel may be lowered onto, for example, a sea bed and thereby, in effect generally define the areas of the bed which will be subjected to the jets of the pressurised fluid.

The framework may have at least one recess the mouth of which, in a direction away from the recess, opens downwardly. The recess may be so shaped and/or dimensioned that it accommodates the conformation of an item over or onto which the apparatus is lowered as the latter sinks or becomes buried in the sea bed. For example, where the apparatus is of annular form, one such recess may be provided on each of the opposite sides of the apparatus in the framework to allow the apparatus to be lowered about a sub sea pipeline, with the two recesses accommodating spaced portions of the pipeline. Thus, the pipeline extends through the apparatus when the latter is in its buried position.

One or more of the jet openings may be provided in the framework adjacent opposite sides of the or each recess. Preferably, on each side of the or each recess there is provided a channel, as described above, having an end which is open and adjacent the mouth of the recess. The ends of the channels on each side of the recess may be of chamfered or inclined form and may diverge with respect to each other in a downwards direction. Applicants have found that apparatus incorporating this arrangement provides for good removal of sub sea bed material from the entry to the mouth of the recess.

The, or the first, chamber may be divided into first and second chamber portions by a partition having at least one hole providing communication between the chamber portions, the inlet to the chamber opening into one of the chamber portions and the other chamber portion communicating with the plurality of openings and the first pump inlet means.

The at least one pump may comprise an annular inlet member with the plurality of first pump inlet means being provided about the periphery of the annular inlet member.

Preferably, the openings are defined by nozzles and are so disposed that the jets of pressurised fluid issue downwardly.

Fluid pressure relief valve means may be provided on the framework, upstream of the openings and of the first pump inlet means. Conveniently, the pressure relief valve means is located in the wall of the, or the first, chamber.

When the apparatus is of annular structure, for example when in the form of a cofferdam, the jet openings and second pump inlet means are provided at spaced intervals around the annular structure.

Where the apparatus is to form a barrier wall or is in the form of a cofferdam comprising one or more barrier walls, the framework may include one or more panels or sheets which form the or each wall. For example, where the apparatus comprises the first and second chambers, the panels or sheets may extend from the first chamber to the second chamber.

The apparatus may be in the form of a modular unit which is one of two or more such modular units which are intended to be secured together to form an assembled apparatus such as an annular cofferdam. In the assembled apparatus, each modular unit can be supplied independently with pressurised water so that during burial of the apparatus there is the facility for some degree of control of the levelling or deliberate tilting of the apparatus by controlled supply of the pressurised fluid to a selected one or selected ones of the units. Even if the apparatus does not comprise discrete, separable modular units but is a one piece apparatus, different portions of the apparatus, for example, the hollow pressure fluid transporting framework of each side of a rectangular form of apparatus may be isolated from i.e. not in fluid communication with, the hollow fluid transporting framework of each of the two adjacent sides of the apparatus. Thus, similar controlled supply of the pressurised fluid to a selected one or selected ones of the sides is possible.

Figure 3:
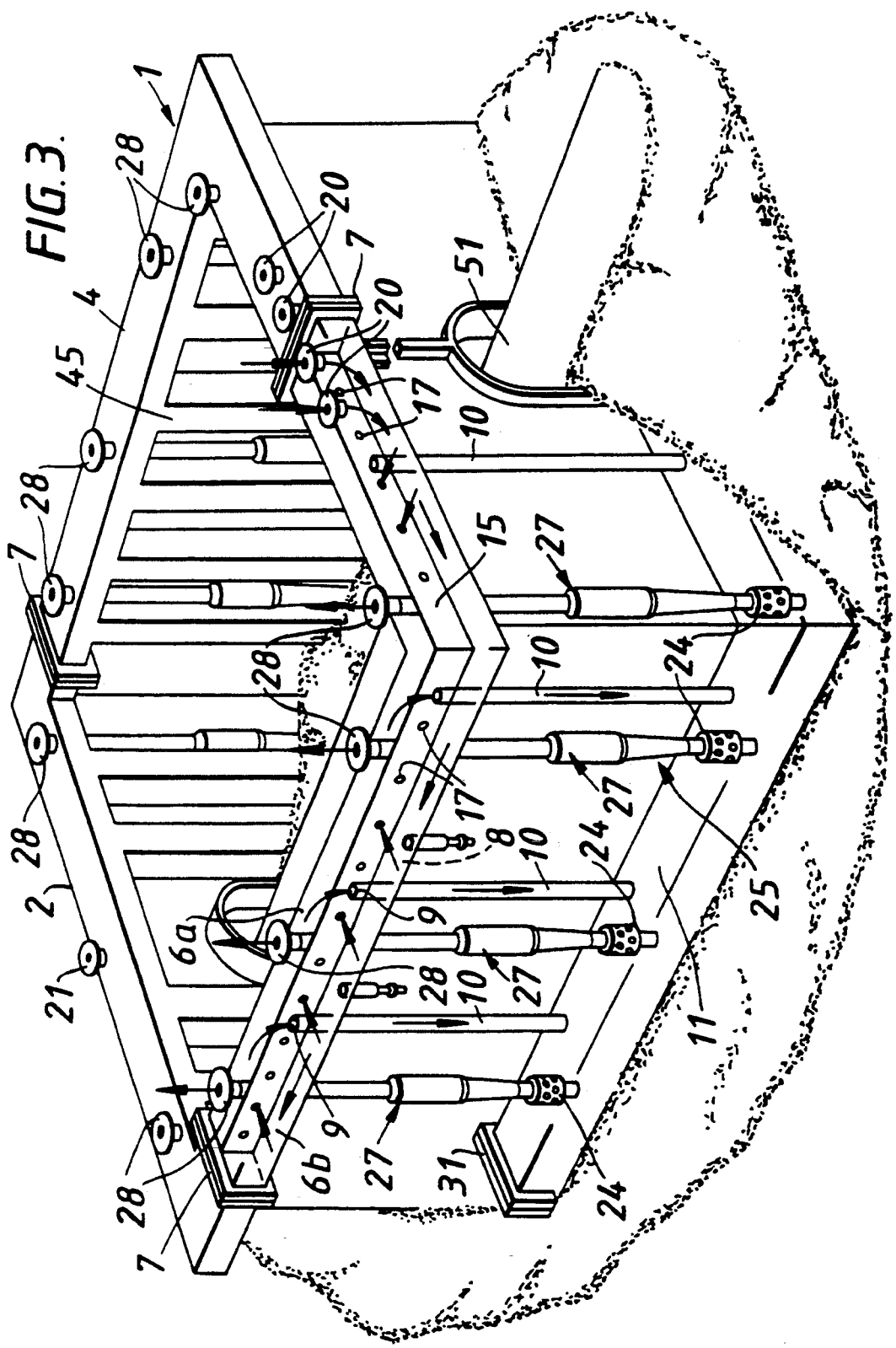
Figure 9A:
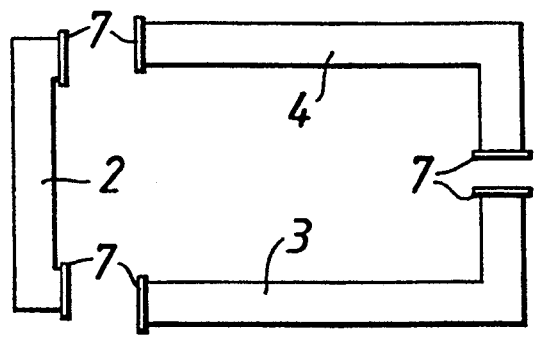
Figure 9B:
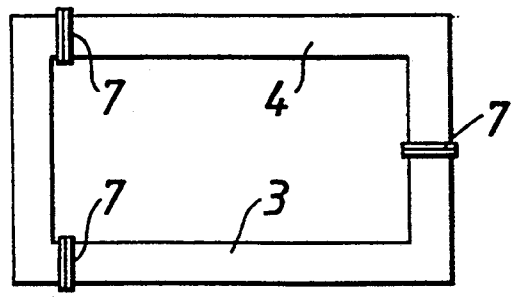
Figure 10:
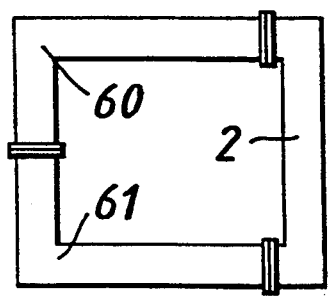
Figure 11:
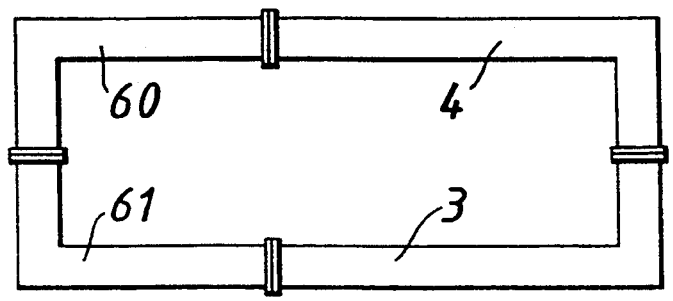

The invention will now be further described, by way of example only, with reference to the accompanying drawings, in which:

FIG. 1 is a perspective view from above of one embodiment of apparatus according to the invention, FIG. 2 is an end view of the apparatus as shown in FIG. 1 in the direction of arrow A, FIG. 3 is a similar view to that shown in FIG. 1 but partly broken away to illustrate construction of internal features of the embodiment and showing one of the recesses accommodating a pipeline, FIG. 4 is an enlarged view of a portion of FIG. 1 showing in more detail the construction of the apparatus and the directions of flow of the pressurised water and suspended-solids through the apparatus, FIG. 5 is an enlarged broken away view of another portion of FIG. 1 at the junction of the channel around the base of the apparatus and the mouth of one of the recesses for accommodating the sub sea pipeline, FIG. 6 is a side view in the direction of arrow B of the portion shown in FIG. 4 with the outer planar wall and corrugated supporting structure omitted, FIG. 7 is a sectional view on the line VII—VII in FIG. 6, FIG. 8 is a sectional view on the line VIII—VIII in FIG. 6, FIGS. 9A and 9B show schematical plan views of the modular units forming the embodiment of apparatus in FIGS. 1 to 8, unassembled and when connected together to provide the assembled apparatus respectively, and, FIGS. 10 and 11 show schematic plan views of illustrative different shaped alternative embodiments of apparatus.

Referring to FIGS. 1 to 8 of the drawings, a rectangular cofferdam 1 intended to be partially buried in a sea bed comprises three modular units 2, 3 and 4 which are secured together to form the four sides of the rectangle. The cofferdam may, for example, be made from plate and hot rolled sections of suitable metal, such as steel.

Each modular unit 2,3,4 comprises a hollow structural framework which includes upper horizontally extending upper box members 5 (see FIGS. 3,4,6,7 and 8) defining chambers 6 but will be described below only in relation to unit 3. Each end of each box member 5 is closed by a flanged plate 7. The flanged plates 7 of adjacent modular units are bolted together to secure the units together. The lower walls 8 of the box members 5 have outlets 9 connected by vertically extending pipes 10 to lower horizontally extending box members 11 defining chambers 12. The pipes 10 not only serve to provide fluid communication between the interiors of the upper and lower box members 5 and 11, i.e. the chambers 12, but also serve as structural supports between the upper and lower box members.

Each chamber 6 is divided longitudinally into inboard and outboard chamber portions 6a, 6b respectively by a partition 15 extending between the top and bottom walls 16, and 8 of the box member 5. The partitions 15 have a series of regularly spaced holes 17 therethrough providing communication between the two chamber portions 6a,6b.

Two flanged inlets 20 for connection to a source of pressurised water are provided on top of each of the box members 5 of the units 3,4 and one flanged inlet 21 on the box member 5 of unit 2. The inlets 20 and 21 open into the associated outboard chamber portions 6b.

Located within the lower box members 11 between the top walls 22 and bottom walls 23 are annular inlet members 24 to ring jet water pumps 25. The inlet members 24 have a plurality of openings 26 about their respective peripheries, serving as first inlet means through which pressurised water from chamber 12 can pass to effect the sucking or drawing action of the pump, as will be described further.

Each ring jet pump 25 has a discharge outlet means forming part of a tubular member 27 which extends vertically upwardly and terminates in a flanged outlet 28 on the top of the upper box member 5. The tubular member 27 comprises sections 27a,27b,27c and 27d connected together. Section 27a is an outlet chamber which extends from within the jet pump inlet member 24. Section 27b is a diffuser section of the jet pump and section 27c is a hose section which connects the diffuser section 27b to the uppermost outlet section 27d. Section 27d extends upwardly through the bottom wall 8 of the upper box member, through the inboard chamber portion 6a and through the top wall 16 to the flanged outlet 28.

The bottom walls 23 of the lower box member 11 are provided with apertures 29 which open into respective lowermost horizontally extending box members 30 beneath. The box members 30 define respective chambers 30a. The bottom walls of the box members 11 also serve as the upper walls of the box members 30. Each opposite end of each box member 11 and 30 is closed by a flanged plate 31. The flanged plates 31 of adjacent modular units are also bolted together to secure the units together.

Each jet pump 25 comprises a second inlet means through which the pump suction effect occurs and which is in the form of a vertical pipe or tube 32 which extends from the annular inlet member 24 of the pump to the lower wall 33 of the lowermost box member and terminates in an open end 34 in the wall 33. The lower end of the section 27a and the upper end of the second inlet pipe 32 define therebetween an annular gap 35 which tapers in the upwardly direction.

Each lower wall 33 is provided with nozzles 36 via which pressurised water from the box member 30 can issue downwardly from the apparatus in the form of jets of water.

The open ends 34 of the second inlet means of the pumps 25 and the nozzles 36 open into a channel 37 defined between opposite side walls 38,39. The opposite side walls 38,39 extend downwardly from the box member 30 so that the mouth 40 of the channel opens or is directed downwardly.

The modular framework unit 2 forming one side of the cofferdam 1 has an inverted U-shaped recess 41, with a downwardly opening mouth 42. On the opposite side of the cofferdam a similar recess 43, with a downwardly opening mouth 44, is provided but in this instance is defined between opposing end portions 3a,4a of the connected together modular framework units 3 and 4. On each side of each recess 41,43 a respective channel 37 has an end 37a which is open and adjacent the mouth of the recess. The ends 38a,39a of the side walls 38,39 at the opposing channel ends 37a are of chamfered or bevelled form (see FIG. 5) and diverge with respect to each other in a downwards direction so that the recess is widest at the outer most end of the its mouth 42 or 44. On each side of the mouth of each recess, in the vicinity of the chamfered end, one or more of the nozzles 36 are provided in the lower wall 33 of the respective lowermost box member 30, as indicated in FIG. 3 in which only one channel 37 with a chamfered end 37a and one nozzle 36 has been shown by way of illustration. As will be appreciated, the end portions of the channels 37 communicate with those of adjacent channels, and the channels extend along and completely around the bottom of the rectangular cofferdam framework, except in the regions of the recesses 41 and 43.

The framework also includes a supporting plate metal structure 45 extending around the periphery of the cofferdam. The plate metal structure 45 is of corrugated-like form with vertically extending rectangular recesses or channels 46,47 opening alternately inwardly and outwardly of the framework and containing the vertically extending pipes 10 and the tubular discharge members 27, respectively. Outwardly of the corrugated-like structure the cofferdam framework is covered by steel panels 48 which form a barrier wall. The supporting structure 45 and the panels 48 extend from the upper box members 5 to the lower box members 12 or from the upper box members 5 to the bounding walls 41a, 43a of the recesses 41,43. Support plates 49 also extend between the top walls 22 and the bottom walls 23 of the box members 11.

Fluid-pressure relief valves 50, are included at intervals along the bottom walls 8 of the box members 5. When pressurised water is supplied to the box members 5, at predetermined pressures the relief valves 50 release over pressurised water from the chambers 6 into the surroundings.

In experiments conducted by Applicants in a sea water dry dock on a simulated seabed the cofferdam 1 was lowered by crane (not shown) into the water and onto the bed (above a pipeline) which had a top layer, of between about 3 to 5 m deep, of loose, silty sand which it was known could readily be fluidised. Beneath the top layer was a medium dense sand.

Prior to lowering the cofferdam, the inlets 20,21 were connected by hoses to pumps (not shown). The pumps supplied a flow of pressurised seawater to the cofferdam. In actual practice at sea, the inlets 20,21 may conveniently be connected by hoses to the fire water pump system of a support vessel at the surface of the sea.

With such an operating arrangement, pressurised water enters the outboard chamber portions 6b. The holes 17 in the partitions 15 control the distribution of the flow of water to the inboard chamber portions 6a.

The inboard chamber portions 6a function as water manifolds which feed water to the vertical pipes 10. The water passes down the pipes 10 into the lower box member chambers 12. The chambers 12 also function as manifolds for distributing the water to the jet pump inlet openings 26 and to the nozzles 36. Water issues from the nozzles in the form of downwardly directed high powered jets. The jet pumps 25 produce a suction effect in a known manner as pressurised water is forced through the openings 26 in the jet pump inlet members 24, and upwardly through the tapering gap 35 into the section 27a and then into section 27b. In this particular case a suction or entrainment effect is produced in the region of the inlets 34. As will be appreciated, the chamber 6 is in permanent communication with the openings of the nozzles 36 and the jet pump inlet openings 26 at all times.

By way of example, in Applicants experiments the cofferdam was operated at a water pressure of approximately 3.5 bar over ambient with over pressurisation being prevented by the relief valves 50.

The cofferdam may have a very large number of nozzles 36, for example about 200, which can deliver, say, 150 liters of water per minute to fluidise the seabed material beneath the channels 37. Fluidised excavation spoil comprising soil, sand and small stones migrates within the channel 37 and is subsequently entrained within the flow of water sucked or drawn upwardly through the inlets 34 of the jet pumps. The water and entrained excavation spoil travels up through the sections of the tubular member 27 to the outlets 28 at the top of the cofferdam and directed away from the work site by means of pipes or hoses (not shown) which are attached to the outlets 28 to discharge the spoil remote from the cofferdam. Applicants experiments have shown that the removal of spoil and rate of descent of the cofferdam into the bed is enhanced by the provision of cut-out portions 39b in the inboard channel wall 39 as shown by way of example in FIGS. 4 and 6. Thus, wall 39 may be viewed as being of castellated form. In another embodiment (not shown) the wall 39 may be omitted altogether.

It will be appreciated that a trench or hollow forms as the excavation spoil is removed from beneath the framework of the cofferdam. The cofferdam sinks into the trench under its own weight and thus sinks into the sea bed. The channels 37 embody the means for producing agitation and suction, and assist in minimising inflow of surrounding subsea soil into the trench or hollow as it is being formed.

By way of illustration of the depths to which it may be required to excavate, sub sea pipelines may be laid at about 1.5 m beneath the surface of the sea bed, and it may be desirable to excavate to a depth of say 3.5 m beneath the surface of the sea bed so that a desired clearance of about 1 m beneath the pipeline can be obtained. This would provide access to the whole circumference of the required portion of the pipeline shown in dotted line at 51 in FIG. 1. It will be appreciated that once the cofferdam has been sunk to the required depth in the sea bed, with the recesses 41,43 accommodating the pipeline, the supply of pressurised water to the cofferdam framework is stopped. Unwanted material which is left within the enclosure formed by the four sides of the cofferdam and which wholly or partly covers the pipeline may be removed, for example, by being sucked away through one or more hoses of a separate suction system (not shown). As such material is being removed to provide the desired clearance around the pipeline and space in which the divers can carry out their work on and around the excavated pipeline, the sides of the cofferdam prevent subsea material surrounding the cofferdam from collapsing into the clearance and space created.

The provision of the open ends 37a of the channels 37 enables at least some of the material in the vicinity of the pipeline 51 to be removed so that the cofferdam can sink over the pipeline.

The presence of water within the hollow framework of the cofferdam assists in stabilising the sunken cofferdam in position. When maintenance or repair work has been completed on the pipeline, lifting of the cofferdam from its position on the seabed can be assisted by connecting the framework to a pressurised air supply and blowing air through the hollow framework to displace the water contained within the framework to reduce the effective weight of the cofferdam. If it is intended that the cofferdam is to remain permanently in its buried position, cement grout may be pumped into the hollow framework to replace the water and further stabilise the cofferdam in its desired sunken position.

If desired, the arrangement may be such that the pressure of the water supplied to the modular units 2,3 and 4, can be independently and selectively controlled from the fire water pump system so that some control over the rate and/or angle of burial of the apparatus can be achieved.

It will be appreciated that the above described embodiment can provide a number of advantages. Ancillary equipment is not required to bury the cofferdam in relatively soft seabed areas since the cofferdam is, in effect, self-burying. There are no mechanically 'moving parts' (except the pressure relief valves) and therefore the likelihood of mechanical breakdown and consequential downtime occurring is small. A safe haven is provided for divers whilst working on the pipeline. By using modular units transportation for example by road, is made more easy.

As will be apparent from FIGS. 9, 10 and 11, compatible modular units of different sizes and/or shapes can be provided and secured together to form cofferdams of different overall sizes and shapes to meet differing requirements. In FIG. 9, the modular units 2, 3 and 4 are assembled into a rectangular form as described above. In FIG. 10, modular units 2, 60 and 61 are assembled into a square form. In FIG. 11, modular units 3,4,60 and 61 are assembled into a larger rectangular form than that shown in FIG. 9.

Whilst a particular embodiment of the invention has been described above, it will be understood that various modifications may be made without departing from the scope of the invention. For example, the cofferdam need not be made of modular units but could be a permanent one-piece structure. Also, the recesses for accommodating the pipeline need not be included in the sides since a cofferdam having no recesses or opening in any of its sides may be required. In place of the recesses further jet pump systems and/or water jet nozzles may be provided.

Moreover, the apparatus according to the present invention may form part of a larger construction including equipment or the like which is connected to apparatus and is to be at least partly buried with the apparatus or is required to be attached to and, in effect, anchored by, apparatus firmly buried in the sea bed.

We claim:

1. Apparatus intended to be at least partially buried in ground beneath water, comprising a hollow structural framework including a chamber having an inlet via which pressurised fluid can be supplied to said chamber, said chamber communicating with a plurality of openings in said framework from which jets of the pressurised fluid are intended to issue and communicating with at least one fluid operated pump via a first pump inlet, the pump being operable by the pressurised fluid to draw or suck water-suspended solids through the pump via a second pump inlet to a discharge outlet from the pump.

2. Apparatus as claimed in claim 1, wherein said chamber serves as a first chamber having outlets connected by pipes to a second chamber below said first chamber, said second chamber containing said first pump inlet and communicating with said openings.

3. Apparatus as claimed in claim 2, in which said second chamber has at least one aperture which opens into a third chamber, said openings being provided in a wall of said third chamber.

4. Apparatus as claimed in claim 3, in which said third chamber is beneath said second chamber.

5. Apparatus as claimed in claim 3, in which said second pump inlet extends through a wall of said third chamber to open outwardly thereof.

6. Apparatus as claimed in claim 2, wherein said discharge outlet of said pump comprises a tubular member which extends upwardly and through said first chamber.

7. Apparatus as claimed in claim 1, in which said second pump inlet means and said openings open into a channel.

8. Apparatus as claimed in claim 7, wherein the mouth of said channel is directed downwardly and said second pump inlet and openings open between opposite side walls of said channel.

9. Apparatus as claimed in claim 7, in which said channel extends along said bottom of the framework.

10. Apparatus as claimed in claim 1, in which said framework has at least one recess the mouth of which in a direction away from the recess opens downwardly.

11. Apparatus as claimed in claim 10, in which one or more of the openings are provided in the framework adjacent opposite sides of the mouth of the recess.

12. Apparatus as claimed in claim 10, in which on each side of said recess said channel has an end which is open and adjacent the mouth of said recess.

13. Apparatus as claimed in claim 12, in which said ends of said channels are of chamfered form and diverge with respect to each other in a downwards direction.

14. Apparatus as claimed in claim 1, wherein said chamber is divided into first and second chamber portions by a partition having at least one hole providing communication between the chamber portions, said inlet to the chamber opening into one of said chamber portions and the other chamber portion communicating with said plurality of openings and said first pump inlet.

15. Apparatus as claimed in claim 1, in which the pump comprises an annular inlet member and a plurality of first inlet means are provided about the periphery of the annular inlet member.

16. Apparatus as claimed in claim 1, in which the openings are defined by nozzles.

17. Apparatus as claimed in claim 1, in which the openings are disposed so that the jets of pressurised fluid issue downwardly.

18. Apparatus as claimed in claim 1, further comprising a fluid pressure relief valve provided on the framework.

19. Apparatus as claimed in claim 18, wherein said fluid pressure relief valve is located in the wall of said chamber.

20. Apparatus as claimed in claim 1, wherein said framework provides a closed form structure.

21. Apparatus as claimed in claim 20, wherein the openings and said second pump inlet are provided around said closed form structure.

22. Apparatus as claimed in claim 1, in which at least part of the framework includes one or more panels or sheets which form one or more walls.

23. Apparatus as claimed in claim 1, in which the framework comprises modular units which are secured together.

24. Apparatus as claimed in claim 1 in the form of a modular unit intended and adapted to be secured to one or more other such modular units.

25. Apparatus as claimed in claim 1, further comprising a fluid pressure relief valve upstream of said openings and of said first pump inlet.

26. Apparatus as claimed in claim 2, wherein said first chamber is divided into first and second chamber portions by a partition having at least one hole providing communication between the chamber portions, said inlet to said first chamber opening into one of the chamber portions and the other chamber portion communicating with said plurality of openings and said first pump inlet.

27. Apparatus as claimed in claim 2, further comprising a pressure relief valve located in the wall of said first chamber.

* * * * *